United States Patent
Takaki

(10) Patent No.: US 10,836,388 B2
(45) Date of Patent: Nov. 17, 2020

(54) VEHICLE CONTROL METHOD AND APPARATUS

(71) Applicant: DENSO CORPORATION, Kariya, Aichi-pref. (JP)

(72) Inventor: Ryo Takaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 323 days.

(21) Appl. No.: 16/019,894

(22) Filed: Jun. 27, 2018

(65) Prior Publication Data

US 2019/0001978 A1   Jan. 3, 2019

(30) Foreign Application Priority Data

Jun. 29, 2017 (JP) .................................. 2017-127329

(51) Int. Cl.
  *B60W 30/18* (2012.01)
  *B60W 40/076* (2012.01)
  *G01S 13/86* (2006.01)

(52) U.S. Cl.
  CPC .......... *B60W 30/18* (2013.01); *B60W 40/076* (2013.01); *G01S 13/867* (2013.01); *B60W 2420/42* (2013.01); *B60W 2420/52* (2013.01); *B60W 2552/15* (2020.02)

(58) Field of Classification Search
  CPC .... B60W 30/18; B60W 40/076; G01S 13/867
  See application file for complete search history.

(56) References Cited

U.S. PATENT DOCUMENTS

| | | | |
|---|---|---|---|
| 6,590,521 B1* | 7/2003 | Saka | G01S 13/867 342/70 |
| 10,442,430 B2* | 10/2019 | Baba | B60T 7/22 |
| 2004/0080450 A1* | 4/2004 | Cheong | G01S 7/4026 342/118 |
| 2006/0125679 A1* | 6/2006 | Horibe | G01S 13/867 342/52 |
| 2007/0080850 A1* | 4/2007 | Abe | G01S 13/867 342/52 |
| 2008/0088707 A1* | 4/2008 | Iwaki | G01S 13/931 348/208.1 |
| 2010/0085238 A1* | 4/2010 | Muller-Frahm | G01S 13/931 342/70 |

(Continued)

FOREIGN PATENT DOCUMENTS

| | | |
|---|---|---|
| JP | H11-37730 | 2/1999 |
| JP | 2005-029025 | 2/2005 |
| JP | 2007-181129 | 7/2007 |

*Primary Examiner* — Donald J Wallace
(74) *Attorney, Agent, or Firm* — Maschoff Brennan

(57) ABSTRACT

In a vehicle control apparatus, a gradient calculator calculates a gradient difference between a reference gradient of a reference road section of an own vehicle and a target gradient of an objective road section of an image-detected object. A corrector corrects, based on the calculated gradient difference, second location information about the image-detected object measured by an imaging device to thereby correct a second distance of the image-detected object relative to the own vehicle. A determiner determines whether a radar-based object is identical with the image-detected object in accordance with first location information about the image-detected object measured by a radar device and the corrected second location information about the image-detected object.

9 Claims, 8 Drawing Sheets

(56) References Cited

U.S. PATENT DOCUMENTS

| | | |
|---|---|---|
| 2013/0236047 A1* | 9/2013 | Zeng ................... G06K 9/00805 |
| | | 382/103 |
| 2014/0139369 A1 | 5/2014 | Baba |
| 2015/0260498 A1* | 9/2015 | Soohoo ................... G01S 17/87 |
| | | 73/1.79 |
| 2016/0207533 A1* | 7/2016 | Uechi ................... B60W 30/09 |
| 2017/0178519 A1* | 6/2017 | Farjon ................... G08G 5/0078 |
| 2018/0087907 A1* | 3/2018 | DeBitetto ............... G01S 19/46 |
| 2018/0188031 A1* | 7/2018 | Samper ............ B60W 30/0953 |
| 2018/0189575 A1* | 7/2018 | Liu ........................ G01S 13/867 |
| 2019/0122555 A1* | 4/2019 | Takaki ...................... B60T 7/12 |
| 2019/0246076 A1* | 8/2019 | Cha ....................... B60W 50/02 |

* cited by examiner

FIG.1
FIG.2
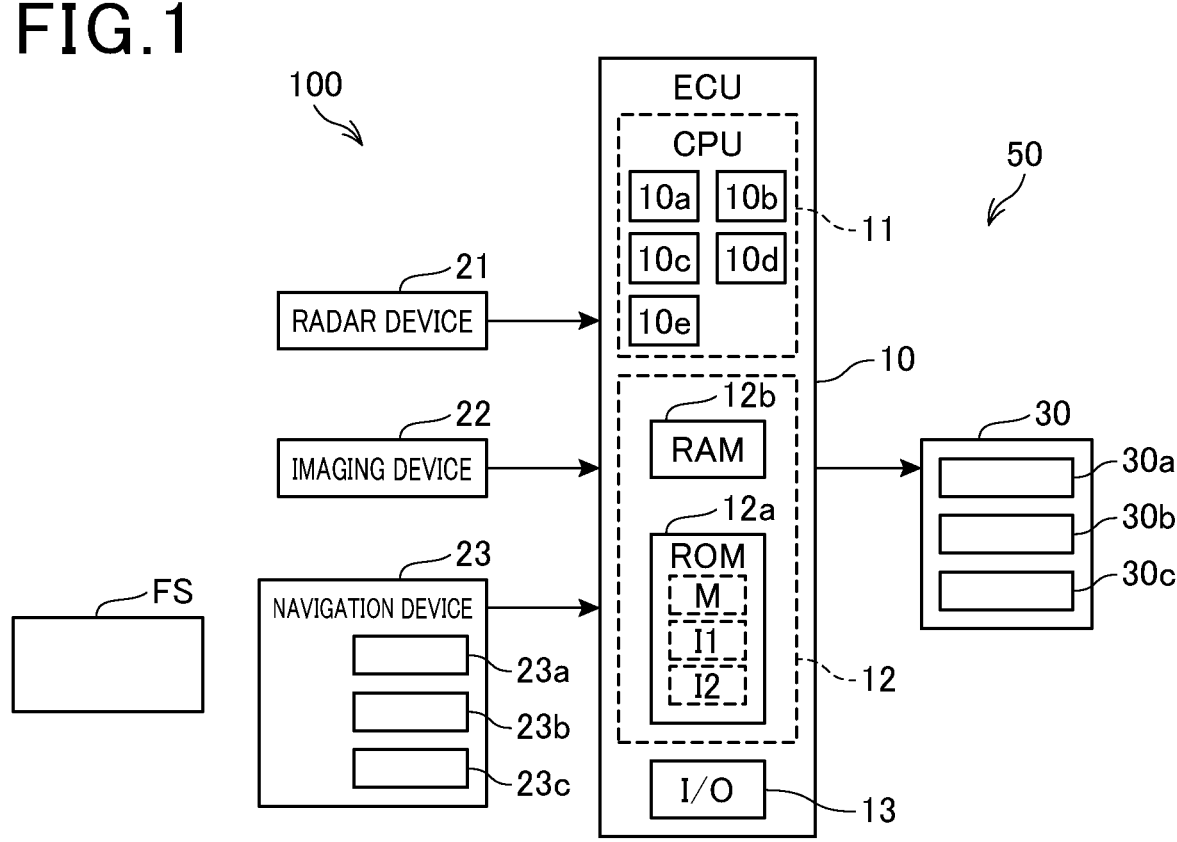
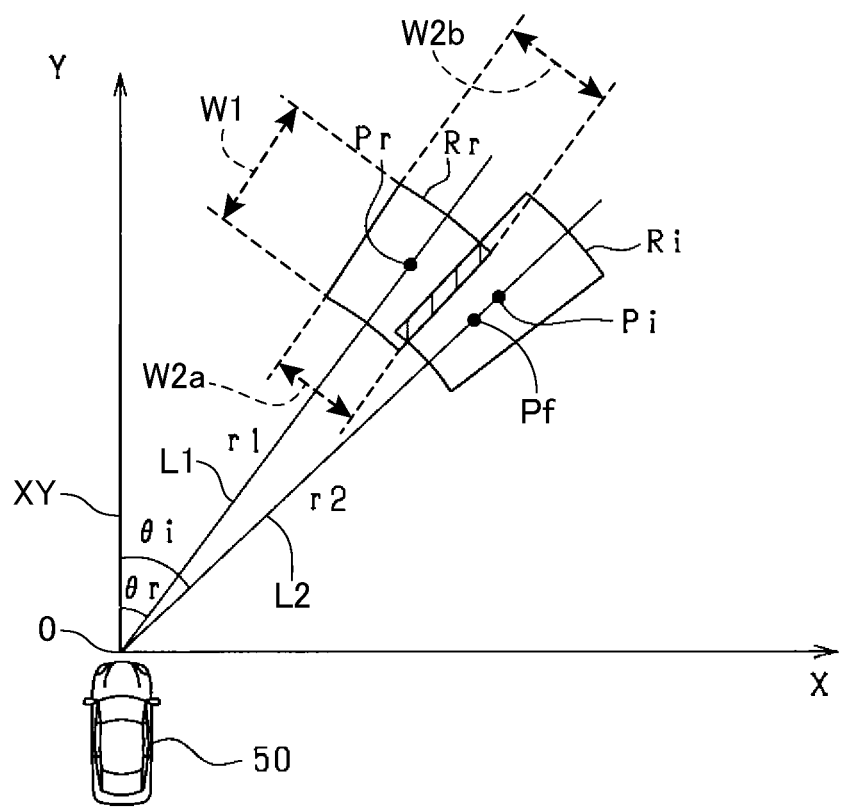

VEHICLE CONTROL METHOD AND APPARATUS

CROSS REFERENCE TO RELATED APPLICATIONS

This application is based on and claims the benefit of priority from Japanese Patent Application 2017-127329 filed on Jun. 29, 2017, the disclosure of which is incorporated in its entirety herein by reference.

TECHNICAL FIELD

The present disclosure relates to vehicle control methods and apparatuses applicable for a vehicle including a radar device and an imaging device.

BACKGROUND

Some vehicle control apparatuses use a fusion technology. The fusion technology checks a radar-based position, i.e. a radar-detected position, of an object detected by a radar device against an image-based position, i.e. an image-detected position, of an object detected by an imaging device to thereby determine whether the radar-based position and the image-based position are based on the same object. The fusion technology performs a fusion task to fuse, i.e. combine, the radar-based position and the image-based position to thereby generate a new fusion position of the same object upon determining that the radar-based position and the image-based position are based on the same object.

For example, an object detection apparatus disclosed in Japanese Patent Application Publication No. 2014-122873, which will be referred to as PTL, determines whether a radar-based position and an image-based position have a predetermined positional relationship therebetween. The object detection apparatus determines that the radar-based position and the image-based position are based on the same object upon determining that the radar-based position and the image-based position have the predetermined positional relationship therebetween. This therefore makes it possible for the vehicle detection apparatus to perform the fusion task set forth above.

Note that each of a radar-based position and an image-based position is detected as a position on a relative coordinate system having (1) The center of the front of an own vehicle as its origin
(2) The width direction of the own vehicle passing through the origin as its X axis
(3) The travelling direction of the own vehicle passing through the origin as its Y axis That is, the object detection apparatus disclosed in the PTL specifies each of the radar-based position and an image-based position based on (1) A distance between the own vehicle and a corresponding object on the relative coordinate system
(2) A horizontal azimuth of a corresponding object with respect to the own vehicle on the relative coordinate system.

SUMMARY

The object detection apparatus disclosed in the PTL is configured to calculate the distance between the own vehicle and an object based on the position of the object with respect to the top-bottom direction, i.e. the vertical direction, in an image captured by the imaging device.

Unfortunately, the object detection apparatus cannot obtain the gradient or inclination of a reference road section on which the own vehicle is travelling and the gradient or inclination of an objective road section, which is different from the reference road section, on which the object is located. For this reason, the object detection apparatus may result in the calculated distance between the own vehicle and the object including an error if there is a relative difference between the gradient of the reference road section and the gradient of the objective road section.

This may result in difficulty for the object detection apparatus to accurately determine whether the radar-based position and the image-based position are based on the same object. This may therefore make it difficult for the object detection apparatus to accurately perform the fusion task.

From this viewpoint, the present disclosure seeks to provide vehicle control methods and apparatuses each installable in an own vehicle for detecting target objects around the own vehicle. Each of the vehicle control methods and apparatuses is capable of accurately determining whether a radar-detected object is identical with an image-detected object even if there is a relative difference between the gradient of a reference road section on which the own vehicle is travelling and the gradient of an objective road section on which the image-based object is located.

According to a first exemplary aspect of the present disclosure, there is provided an apparatus for controlling an own vehicle that is travelling on a reference road section, the own vehicle including a radar device and an imaging device that are each configured to perform a target-object detection operation. The apparatus includes a first obtainer configured to obtain first location information about a radar-detected object in accordance with a result of the target-object detection operation performed by the radar device. The first location information includes a first distance of the radar-detected object relative to the own vehicle and a first azimuth of the radar-detected object relative to the own vehicle. The apparatus includes a second obtainer configured to obtain second location information about an image-detected object located on an objective road section based on a result of the target-object detection operation performed by the imaging device. The second location information includes a second distance of the image-detected object relative to the own vehicle and a second azimuth of the image-detected object relative to the own vehicle. The apparatus includes a gradient calculator configured to calculate a gradient difference between a reference gradient of the reference road section and a target gradient of the objective road section. The apparatus includes a corrector configured to correct, based on the calculated gradient difference, the second location information about the image-detected object to thereby correct the second distance of the image-detected object relative to the own vehicle. The apparatus includes a determiner configured to determine whether the radar-detected object is identical with the image-detected object in accordance with the first location information about the radar-detected object and the corrected second location information about the image-detected object.

According to a second exemplary aspect of the present disclosure, there is provided a method of controlling, using a computer, an own vehicle that is travelling on a reference road section, the own vehicle including a radar device and an imaging device that are each configured to perform a target-object detection operation. The method is configured to cause the computer to execute the steps of 1. Obtaining first location information about a radar-detected object in accordance with a result of the target-object detection operation performed by the radar device, the first location information including a first distance of the radar-detected object relative to the own vehicle and a first azimuth of the radar-detected object relative to the own vehicle 2. Obtaining second location information about an image-detected object located on an objective road section based on a result of the target-object detection operation performed by the imaging device, the second location information including a second distance of the image-detected object relative to the own vehicle and a second azimuth of the image-detected object relative to the own vehicle 3. Calculating a gradient difference between a reference gradient of the reference road section and a target gradient of the objective road section 4. Correcting, based on the calculated gradient difference, the second location information about the image-detected object to thereby correct the second distance of the image-detected object relative to the own vehicle 5. Determining whether the radar-detected object is identical with the image-detected object in accordance with the first location information about the radar-detected object and the corrected second location information about the image-detected object Each of the apparatus and method is configured to calculate the gradient difference between the reference gradient of the reference road section and the target gradient of the objective road section, and correct, based on the calculated gradient difference, the second location information about the image-detected object to thereby correct the second distance of the image-detected object relative to the own vehicle. Then, each of the apparatus and method is configured to determine whether the radar-detected object is identical with the image-detected object in accordance with the first location information about the radar-detected object and the corrected second location information about the image-detected object.

This configuration enables the corrected second location information which has been corrected using the gradient difference to be obtained, making it possible to accurately determine whether the radar-detected object is identical with the image-detected object. That is, this configuration enables a fusion target object to be accurately obtained even if a gradient difference exists between the reference road section on which the own vehicle is travelling and the objective road section on which the image-detected object is located.

BRIEF DESCRIPTION OF THE DRAWINGS

Other aspects of the present disclosure will become apparent from the following description of embodiments with reference to the accompanying drawings in which:

FIG. 1 is a block diagram schematically illustrating an example of the configuration of a vehicle control apparatus according to a present embodiment of the present disclosure;

FIG. 2 is a diagram schematically illustrating a radar detection point and an image detection point on a relative coordinate system according to the present embodiment;

DETAILED DESCRIPTION OF EMBODIMENT

Figure 3:
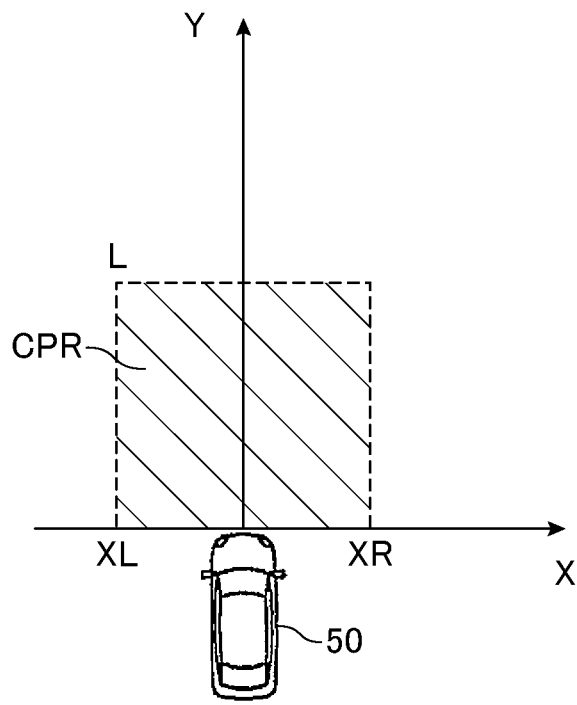
FIG. 3 is a diagram schematically illustrating a collision prediction region defined relative to an own vehicle according to the present embodiment.

The following describes a present embodiment of the present disclosure with reference to the accompanying drawings.

FIG. 1 schematically illustrates a pre-crash safety (PCS) system 100 based on a vehicle control apparatus according to the present embodiment installed in an own vehicle 50. The PCS system 100 is capable of 1. Recognizing an object located around the own vehicle 50, such as ahead of the own vehicle 50 in the travelling direction of the own vehicle 50, i.e. in the forward direction of the own vehicle 50

2. Performing control tasks of the own vehicle 50 including a collision avoidance operation to avoid collision between the recognized object and the own vehicle 50 and/or a damage mitigation operation to mitigate damage due to collision therebetween upon determining that there is a possibility of the own vehicle 50 colliding with the recognized object Referring to FIG. 1, the PCS system 100 includes an electronic control unit (ECU) 10, a radar device 21, an imaging device 22, which are an example of object detection sensors, a navigation system 23, and cruise assist devices 30.

In FIG. 1, the ECU 10 serves as the vehicle control apparatus according to the present embodiment.

The radar and imaging devices 21 and 22 are communicably connected to the ECU 10.

For example, the radar device 21 is designed to detect objects located in front of the own vehicle 50 using, for example, directional electromagnetic waves, i.e. probe waves, such as millimeter waves or radar waves. The radar device 21 is mounted at, for example, the center of the front end of the own vehicle 50 such that its optical axis of the probe waves is directed toward the forward direction of the own vehicle 50.

The radar device 21 has a predetermined detection range that has a predetermined view angle, such as a detection angle, or scanning angle, and extends in the right and left direction around the optical axis. That is, the radar device 21 is capable of detecting the position of an object within the detection range.

Specifically, the radar device 21 performs, in a first period, an object information obtaining task to 1. Transmit probe waves to the detection range through a transmitting antenna 2. Receive reflected waves, i.e. echoes, based on reflection of the transmitted radar waves by the outer surface of an object through respective receiving antennas 3. Calculate the relative position of the object relative to the own vehicle 50 based on the transmission time of the probe waves and the reception times of the respective reflected waves 4. Calculate the azimuth of the object based on the differences in phase between the reflection waves received by the respective receiving antennas 5. Calculate the relative speed between the own vehicle 50 and the object based on the frequencies of the reflected waves; the frequencies having been changed based on the Doppler effect.

That is, the radar device 21 obtains, in the first period, first detection information including the relative position, azimuth, and relative speed of the object. Note that objects detected by the radar device 21 will be referred to as radar-detected objects.

The radar device 21 also outputs, to the ECU 10, the obtained first detection information about the radar-detected object in the first period.

The imaging device 22 is designed as a camera device, such as a CCD camera device, a CMOS image sensor device, or a near-infrared camera device. For example, the imaging device 22 is mounted to the center of a predetermined portion, such as the upper end of the front windshield, of the own vehicle 50 in the vehicle width direction at a predetermined height. The imaging device 22 has an optical axis extending in front of the own vehicle 50. The imaging device 22 has a region, i.e. an imaging range, that horizontally extends around the optical axis within a predetermined angular range, i.e. a predetermined angle of view. The imaging device 22 captures, from the predetermined height, i.e. from a higher point of view, images of the region, i.e. the imaging range in the second period, and sends, to the ECU 10, the captured images in the second period as second detection information. Note that a monocular camera device or a stereo camera device can be used as the imaging device 22, and a monocular camera device is used as the imaging device 22 in the present embodiment.

Each of the captured images has a predetermined height in its vertical direction and a width in its horizontal direction.

Target objects detected based on the images captured by the imaging device 22 will be referred to as image-detected objects.

The navigation device 23 is configured to provide road information about a road on which the own vehicle 50 is travelling to the ECU 10.

The navigation device 23 includes a memory 23a, a controller 23b, and a display unit 23c. The memory 23a stores map information M including roads on which the own vehicle 50 can travel, and including peripheries around each road.

The controller 23b receives GPS signals from GPS satellites, and determines the current location of a predetermined point, such as the center of gravity, of the own vehicle 50 based on the received GPS signals. The current location of the own vehicle 50 can be expressed as a corresponding longitude and a corresponding latitude. Then, the controller 23b selects, from the memory 23a, a map on and around the current location of the own vehicle 50, and causes the display unit 23c to display the map on which the current location of the own vehicle 50 is displayed. In response to driver's input of a desired destination from the current location of the own vehicle 50, the controller 23b causes the display unit 23c to display one or more suitable routes to the destination from the current location of the own vehicle 50. This navigates the driver to drive the own vehicle 50 in accordance with a selected one of the suitable routes to the destination.

The navigation device 23 is also capable of cyclically accessing external infrastructural systems FS that can deliver traffic and travel information to road vehicle drivers. Each cyclic access obtains various pieces of traffic information about the roads located on and around the current location of the own vehicle 50. The various pieces of traffic information include (1) Information indicative of the number of lanes in each of roads located within a predetermined distance area around the current location of the own vehicle 50

(2) Information indicative of the locations of intersections within the predetermined distance area around the current location of the own vehicle 50

(3) Information indicative of the gradients of respective sections of each road located on and around the current location of the own vehicle 50

The navigation device 23 is further capable of sending the obtained traffic information to the ECU 10 for each cyclic access.

The cruise assist devices 30 include, for example, a warning device 30a, a brake device 30b, and a steering device 30c. The warning device 30a includes a speaker and/or a display mounted in the compartment of the own vehicle 50. The warning device 30a is configured to output warnings including, for example, warning sounds and/or warning messages to inform the driver of the presence of an object in response to a control instruction sent from the ECU 10.

The brake device 30b is configured to brake the own vehicle 50. The brake device 30b is activated in response to a control instruction sent from the ECU 10 when the ECU 10 determines that there is a high probability of collision of the own vehicle 50 with an object. Specifically, the brake device 30b performs a brake-assist function of increasing braking force, which is based on the driver's brake operation, to the own vehicle 50, or an automatic brake function of automatically braking the own vehicle 50 if there is no braking operation by the driver.

The steering device 30c is configured to control the travelling course of the own vehicle 50. The steering device 30c is activated in response to a control instruction sent from the ECU 10 when the ECU 10 determines that there is a high probability of collision of the own vehicle 50 with an object. Specifically, the steering device 30c performs a steering assist function of assisting a driver's steering operation of the steering wheel of the own vehicle 50, or an automatic steering function of automatically steering the own vehicle 50 if there is no steering operation by the driver.

The ECU 10 is designed as, for example, a microcomputer including a CPU 11, a memory 12 comprised of at least a ROM 12a, a RAM 12b, and/or a semiconductor memory such as a flash memory. The ECU 10 includes an I/O device (I/O) 13 connected via input ports to the radar device 21, the imaging device 22, and the cruise assist devices 30.

The various functions of the PCS system 100 are implemented by the CPU 11 in executing programs that are stored in non-transitory recording media. For example, the memory 12 serves as the non-transitory recording media in which the programs are stored. Furthermore, the CPU 11 executes the programs, thus executing methods corresponding to the programs. The PCS system 100 is not necessarily configured with a single microcomputer, and it would be equally possible to have a plurality of microcomputers.

In particular, the ECU 10 is configured to

1. Recognize at least one object in accordance with the first detection information input from the radar device 21 and the second detection information including a captured image input from the imaging device 22

2. Perform a PCS control task based on the cruise assist devices 30 for the recognized at least one object The following describes the details of the PCS control task carried out by the ECU 10.

The ECU 10 according to the present embodiment defines a relative coordinate system, i.e. an XY coordinate system, XY in, for example, a storage space of the memory 12; the relative coordinate system XY has (1) The center of the front of the own vehicle 50 as its origin or its reference point O (2) The width direction of the own vehicle 50 passing through the origin as its X axis (3) The travelling direction of the own vehicle 50 passing through the origin as its Y axis, in other words, a reference axis The ECU 10 obtains, based on the relative position, azimuth, and relative speed of a radar-detected object relative to the own vehicle 50, a radar-detected position of the radar-detected object identified by a distance and a horizontal azimuth of the radar-detected object relative to the own vehicle 50 on the relative coordinate system XY set forth above.

In addition, the ECU 10 obtains, based on a captured image as the second detection information, an image-detected position of an image-detected object on the relative coordinate system XY. Then, the ECU 10 determines whether the radar-detected object is identical with the image-detected object based on the radar-detected position of the radar-detected object and the image-detected position of the image-detected object.

The following describes the radar-detected position of a radar-detected object and the image-detected position of an image-detected object with reference to FIG. 2 in which the relative coordinate system, i.e. X-Y coordinate system, XY is illustrated.

First, the ECU 10 obtains, as the radar-detected position of a radar-detected object, a radar detection point Pr on the relative coordinate system XY in accordance with a relative distance r1 and a horizontal azimuth, i.e. a horizontal azimuth angle, θr of the radar-detected object relative to the own vehicle 50. The radar detection point Pr serves as first location information about the radar-detected object.

As illustrated in FIG. 2, the relative distance r1 represents a minimum distance between the reference point O of the own vehicle 50 and, for example, the center of the rear end of the radar-detected object, and the horizontal azimuth θr represents a horizontal angle of a line L1 connecting between the reference point O and the center of the rear end of the radar-detected object relative to the reference axis (Y axis). This enables the radar detection point Pr to be expressed as Pr(r1, θr).

Additionally, the ECU 10 obtains, as the image-detected position of an image-detected object, an image detection point Pi on the relative coordinate system XY in accordance with a relative distance r2 and a horizontal azimuth, i.e. a horizontal azimuth angle, θi of the image-detected object relative to the own vehicle 50. The image detection point Pi serves as second location information about the image-detected object.

As illustrated in FIG. 2, the relative distance r2 represents a minimum distance between the reference point O of the own vehicle 50 and, for example, the center of the lower end of the image-detected object, and the horizontal azimuth θi represents a horizontal angle of a line L2 connecting between the reference point O and the center of the lower end of the image-detected object relative to the reference axis (Y axis). This enables the image detection point Pi to be expressed as Pi(r2, θi).

That is, the ECU 10 calculates the relative distance r2 of the image-detected object relative to the reference point O of the own vehicle 50 based on the position of the center of the lower end of the image-detected target in the captured image in the vertical direction.

Next, the ECU 10 sets, in the relative coordinate system XY, a radar search region Rr in accordance with the radar detection point Pr.

Specifically, the radar search region Rr has a longitudinal width and opposing lateral widths. The longitudinal width is an assumed error amount set with reference to the radar detection point Pr of the radar-detected object in a distance direction. Each of the opposing lateral widths is also an assumed error amount set with reference to the radar detection point Pr of the radar-detected object in an azimuth direction. The distance direction is defined as the direction of the distance between the reference point O and the radar detection point Pr, and the azimuth direction is defined as the direction along the angular change of the azimuth angle θr relative to the reference axis (Y axis). The assumed error amount of each of the distance direction and the azimuth direction of the radar search region Rr has been set beforehand based on the characteristics of the radar device 21.

The longitudinal width of the radar search region Rr in the distance direction will be referred to as a longitudinal width W1, and the lateral widths of the radar search region Rr in the azimuth direction will be respectively referred to as lateral widths W2a and W2b.

For example, the radar search region Rr includes the radar detection point Pr(r1, θr), and has a substantially rectangular shape with the longitudinal width W1 as its longitudinal side and the lateral widths W2a and W2b as its opposing lateral sides. The lateral side W2b, which is the farther from the origin O than the lateral side W2a, is set to be larger than the lateral side W2a.

Similarly, the ECU 10 sets, in the relative coordinate system XY, an image search region Ri in accordance with the image detection point Pi.

Specifically, the image search region Ri has a longitudinal width and opposing lateral widths. The longitudinal width is an assumed error amount set with reference to the image detection point Pi of the image-detected object in a distance direction. Each of the opposing lateral widths is also an assumed error amount set with reference to the image detection point Pi of the image-detected object in an azimuth direction. The distance direction is defined as the direction of the distance between the reference point O and the image detection point Pi, and the azimuth direction is defined as the direction along the angular change of the azimuth angle θi relative to the reference axis (Y axis). The assumed error amount of each of the distance direction and the azimuth direction of the image search region Ri has been set beforehand based on the characteristics of the imaging device 22.

The longitudinal width of the image search region Ri in the distance direction will be referred to as a longitudinal width W11, and the lateral widths of the image search region Ri in the azimuth direction will be respectively referred to as lateral widths W12a and W12b.

For example, the image search region Ri includes the image detection point Pi(r2, θi), and has a substantially rectangular shape with the longitudinal width W11 as its longitudinal side and the lateral widths W12a and W12b as its opposing lateral sides. The lateral side W12b, which is the farther from the origin O than the lateral side W12a, is set to be larger than the lateral side W12a.

That is, the ECU 10 determines whether the radar-detected object is identical with the image-detected object in accordance with a predetermined determination condition based on the radar detection point Pr and the image detection point Pi.

In particular, the ECU 10 uses, as the identification determination condition, determination of whether the radar search region Rr defined based on the radar detection point Pr is at least partially overlapped with the image search region Ri defined based on the image detection point Pi to thereby determine whether the radar-detected object is identical with the image-detected object.

For example, in FIG. 2, because the radar search region Rr and the image search region Ri have a partly overlapped portion therebetween, the ECU 10 determines that the radar-detected object is identical with the image-detected object. Upon determining that the radar-detected object is identical with the image-detected object, the ECU 10 fuses, i.e. combines, the radar detection point Pr and the image detection point Pi with each other to thereby generate a new fusion position for a same target object.

For example, in FIG. 2, the ECU 10 selects the relative distance r1, which is higher in accuracy than the azimuth angle θr, from the radar detection point Pr(r1, θr), and selects the azimuth angle θi, which is higher in accuracy than the relative distance r2, from the image detection point Pi(r2, θi). Then, the ECU 10 fuses, i.e. combines, the selected relative distance r1 and the selected azimuth angle θi with each other, thus generating a new fusion detection point Pf(r1, θi) for the same target object; the same target object will be referred to as a fusion target object.

Next, the ECU 10 determines whether there is a possibility of the own vehicle 50 colliding with the fusion target object.

For example, the ECU 10 has a predetermined collision prediction region CPR previously defined for the own vehicle 50 in the relative coordinate system XY.

For example, the collision prediction region CPR

1. Has the center axis corresponding to the Y axis illustrated in FIG. 30

2. Has a rightward width based on a rightward limit XR in the rightward direction relative to the travelling direction corresponding to the X-axis direction 3. Has a leftward width based on a leftward limit XL in the rightward direction relative to the travelling direction 4. Has a predetermined length, i.e. depth, L from the reference point O of the own vehicle 50 along the Y axis direction That is, the ECU 10 calculates a lateral coordinate of the fusion detection point Pf(r1, θi) relative to the Y axis. Then, the ECU 10 determines whether the lateral coordinate of the fusion detection point Pf(r1, θi) is located within the collision prediction region CPR to thereby determine whether there is a possibility of collision of the own vehicle 50 with the target object.

Upon determining that the lateral coordinate of the fusion detection point Pf(r1, θi) is located outside the collision prediction region CPR, the ECU 10 determines that there is no possibility of collision of the own vehicle 50 with the fusion target object.

Otherwise, upon determining that the lateral coordinate of the fusion detection point Pf(r1, θi) is located within the collision prediction region CPR, the ECU 10 determines that there is a possibility of collision of the own vehicle 50 with the fusion target object.

Upon determining that there is a possibility of collision of the own vehicle 50 with the target object, the ECU 10 calculates a time to collision (TTC), which represents a margin time until which the own vehicle 50 would collide with the fusion target object, in accordance with the relative position of the fusion target object and the relative speed between the own vehicle 50 and the fusion target object.

Then, the ECU 10 compares the calculated TIC with predetermined activation times of the respective cruise-assist devices 30, i.e. thresholds representing the respective activation times to thereby selectively activate at least one of the cruise-assist devices 30.

Specifically, the thresholds are respectively set for the warning device 30a, the brake device 30b, and the steering device 30c. The relative sizes among the thresholds are identical to the above relative sizes among the activation times.

The thresholds respectively set for the warning device 30a, the brake device 30b, and the steering device 30c are for example determined such that the threshold for the warning device 30a is larger than the threshold for the brake device 30b, and the threshold for the steering device 30c is larger than the threshold for the brake device 30b.

If the own vehicle 50 approaches the fusion target object, so that the TTC becomes lower than the threshold for the activation timing for the warning device 30a, the ECU 10 determines that it is time to activate the warning device 30a, thus transmitting an activation control signal to the warning device 30a. This causes the warning device 30a to be activated to output warnings, thus informing the driver of a risk of collision with the fusion target object.

After activation of the warning device 30a, if the own vehicle 50 further approaches the fusion target object with the brake pedal being not depressed by the driver, so that the ITC further decreases to become lower than the threshold for the activation timing for the automatic brake function of the brake device 30b, the ECU 10 determines that it is time to activate the automatic brake function of the brake device 30b, thus transmitting an activation control signal to the automatic brake function of the brake device 30b. This causes the brake device 30b to be activated to perform braking control of the own vehicle 50.

On the other hand, after activation of the warning device 30a, if the own vehicle 50 further approaches the fusion-based object despite the driver's depression of the brake pedal, so that the TC further decreases to become lower than the threshold for the activation timing for the brake-assist function of the brake device 30b, the ECU 10 determines that it is time to activate the brake-assist function of the brake device 30b, thus transmitting an activation control signal to the brake-assist function of the brake device 30b. This causes the brake device 30b to be activated to increase braking force based on the driver's depression of the braking pedal.

After activation of the brake device 30b, if the own vehicle 50 further approaches the fusion target object, so that the TTC further decreases to become lower than the threshold for the activation timing for the steering device 30c, the ECU 10 determines that it is time to activate the steering device 30c, thus transmitting an activation control signal to the steering device 30c. This causes the steering device 30c to be activated to perform forcible steering control of the own vehicle 50.

The above PCS control task aims to avoid a collision between the own vehicle 50 and the fusion target object or mitigate damage due to collision therebetween.

As described above, the ECU 10 calculates the relative distance r2 of the image-detected object relative to the reference point O of the own vehicle 50 based on the position of the center of the lower end of the image-detected target in the captured image in the vertical direction.

Figure 4:
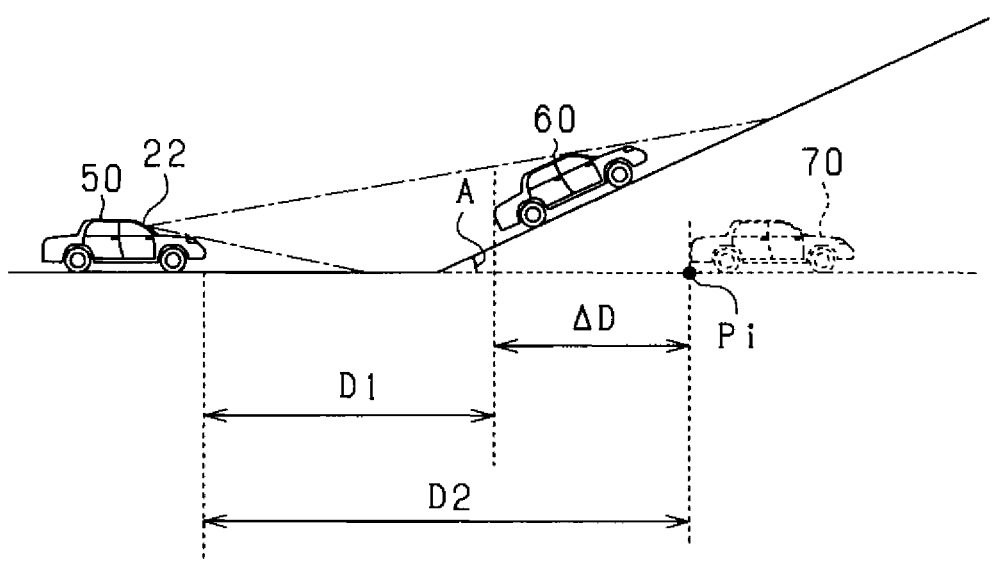
FIG. 4 is a diagram schematically illustrating a situation where an imaging device captures a preceding vehicle that is travelling on an objective road section having an upward gradient.

FIG. 4 schematically illustrates a situation where the own vehicle 50 is travelling on a reference road section whose gradient or inclination angle relative to a predetermined flat road section is zero degrees, i.e. the reference road section is the flat road section. FIG. 4 also schematically illustrates that a preceding vehicle 60 as the image-detected object is travelling or located on an objective road section whose upward gradient or inclination angle relative to the predetermined flat road section is predetermined A degrees greater than zero degrees, so that the preceding vehicle 60 is located to be higher than the own vehicle 50.

We focus on the fact that the preceding vehicle 60 in an image captured by the imaging device 22 of the own vehicle 50 in this situation illustrated in FIG. 4 is located to be higher than a preceding vehicle that is travelling on the same reference road section.

Unfortunately, it is difficult for the ECU 10 to obtain, from an image captured by the imaging device 22, the upward gradient of the objective road section on which the preceding vehicle 60 is travelling relative to the reference road section. This may result in the image detection point Pi of the preceding vehicle 60 being obtained, based on the captured image, as an erroneous image detection point Pi, so that the preceding vehicle 60 may be detected as an erroneous preceding vehicle 70.

For this reason, there may be a gap ΔD between the relative distance D2 between the reference point O of the own vehicle 50 and the erroneous image detection point Pi and an actual relative distance D1 between the reference point O of the own vehicle 50 and the center of the rear end of the actual preceding vehicle 60. That is, the relative distance D2 between the reference point O of the own vehicle 50 and the erroneous image detection point Pi may be longer than the actual relative distance D1.

In contrast, let us consider an additional situation where (1) The own vehicle 50 is travelling on the reference road section whose gradient or inclination angle relative to the predetermined flat road section is zero degrees (2) A preceding vehicle 60 as the fusion target object is travelling on an objective road section whose downward gradient or inclination angle relative to the predetermined reference road section is predetermined degrees smaller than zero degrees, so that the preceding vehicle 60 is located to be lower than the own vehicle 50

Note that an upward inclination angle is set to have a positive polarity, and a downward inclination angle is set to have a negative polarity.

Like the upward slope of the objective road section, there may be a gap ΔD between the relative distance D2 between the reference point O of the own vehicle 50 and an erroneous image detection point Pi and an actual relative distance D1 between the reference point O of the own vehicle 50 and the center of the rear end of the actual preceding vehicle 60. That is, the relative distance D2 between the reference point O of the own vehicle 50 and the erroneous image detection point Pi may be shorter than the actual relative distance D1.

The gap ΔD may cause the location of the image search region Ri established based on the erroneous image detection point Pi to be deviated from an actual location of the image search region Ri in the distance direction. This may make it difficult for the ECU 10 to accurately determine whether the radar-detected object is identical with the image-detected object.

From this viewpoint, the ECU 10 according to the present embodiment is configured to (1) Calculate a relative gradient difference Δα between the reference road section on which the own vehicle 50 is travelling and the objective road section on which the image-detected object is located (2) Correct, based on the calculated relative gradient difference Δα, the location of the image search region Ri in the distance direction to thereby calculate a corrected image search region (3) Determine whether the radar-detected object is identical with the image-detected object in accordance with the radar search region Rr and the corrected image search region This configuration enables determination of whether the radar-detected object is identical with the image-detected object to be accurately carried out even if there is a relative gradient difference Δα between the reference road section on which the own vehicle 50 is travelling and the objective road section on which the image-detected object is located.

For example, the ECU 10 carries out the following gradient difference calculation task to thereby calculate the gradient difference Δα.

Specifically, the ECU 10 obtains gradient information about the reference road section on which the own vehicle 50 is travelling. For example, the ECU 10 obtains, from the navigation system 23, the current location of the own vehicle 50 and information about the reference road section determined by the current location of the own vehicle 50. Then, the ECU 10 obtains, from the information about the road at the current location of the own vehicle 50 stored in the map information M, an inclination angle α1 of the reference road section on which the own vehicle 50 is travelling. Note that, if the own vehicle 50 incorporates therein a gyro sensor or an inclination angle sensor for measuring an inclination angle of the own vehicle 50 relative to a reference flat plane, the ECU 10 can obtain the inclination angle α1 of the reference road section on which the own vehicle 50 is travelling in accordance with a value measured by the gyro sensor or inclination angle sensor.

In addition, the ECU 10 obtains gradient information about the objective road section on which the image-detected object, such as a preceding vehicle 60, is travelling. For the sake of simplified description, the following describes the gradient difference calculation task using the preceding vehicle 60 as the fusion target object.

For example, the ECU 10 obtains, from the navigation system 23, information about the objective road section determined based on an estimated current location of the preceding vehicle 60. Then, the ECU 10 obtains, from the information about the road at the estimated current location of the preceding vehicle 60 stored in the map information M, an inclination angle α2 of the objective road section on which the preceding vehicle 60 is travelling.

Specifically, the ECU 10 can estimate the current location of the preceding vehicle 60 based on the current location of the own vehicle 50 and the relative distance of the image detection point Pi relative to the reference point O of the own vehicle 50.

In particular, as illustrated in FIG. 4, if there is an upward slope section or a downward slope section of the road in front of the own vehicle 50, the relative distance of the image detection point Pi relative to the reference point O of the own vehicle 50 may contain an error.

Figure 5:
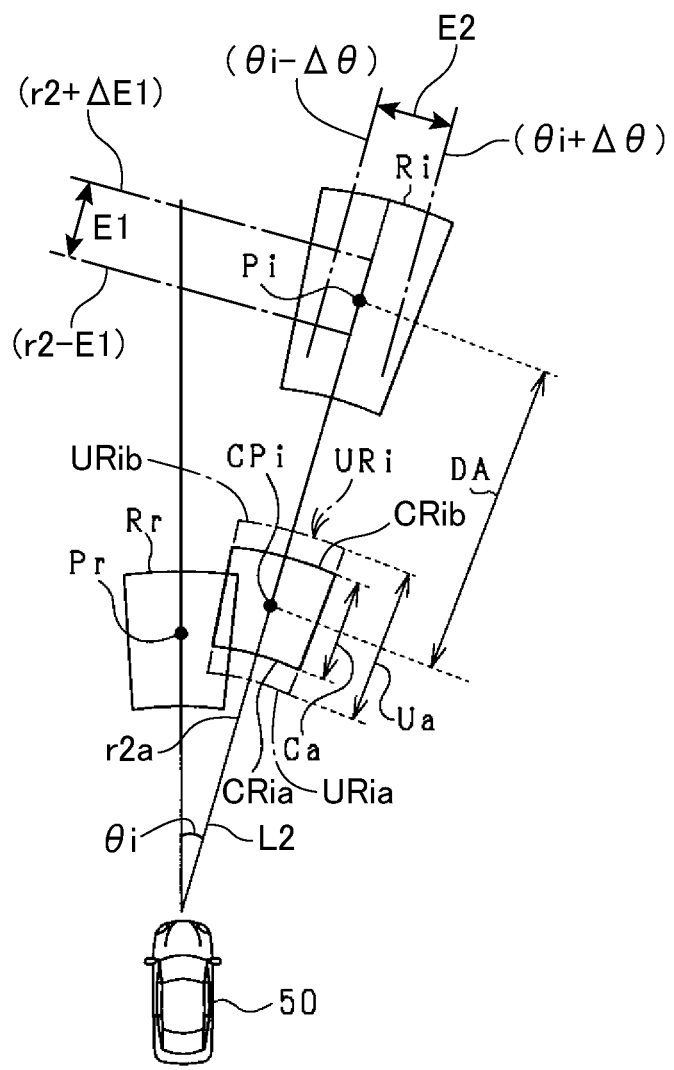
FIG. 5 is a diagram schematically illustrating how to correct an image search region upon a gradient difference being positive according to the present embodiment.

In order to address such an issue, the ECU 10 is configured to obtain, as the gradient information about the objective road section on which the preceding vehicle 60 is travelling, gradient information about a predetermined first inclination detection range E1 including the image detection point Pi (see FIG. 5). The first inclination detection range E1 is defined as a linear range along the distance direction of the image detection point Pi from a first margin to a second margin inclusive; the first margin is obtained by subtraction of a predetermined value $\Delta$E1 from the relative length r2 at the image detection point Pi, which is referred to as (r2−$\Delta$E1), and the second margin is obtained by the sum of the relative length r2 at the image detection point Pi and the predetermined value $\Delta$E1, which is referred to as (r2+$\Delta$E1).

For example, the ECU 10 calculates an inclination angle at each of plural sampling points in the first inclination detection range E1, and calculates the average value of the calculated inclination angles as an inclination angle $\alpha$2 of the objective road section on which the preceding vehicle 60 is travelling. The ECU 10 can change the length of the first inclination detection range E1 along the distance direction depending on the relative distance r2 of the image detection point Pi.

In addition, the ECU 10 can be configured to obtain, as the gradient information about the objective road section on which the preceding vehicle 60 is travelling, gradient information about a predetermined second inclination detection range E2 including the image detection point Pi (see FIG. 5). The second inclination detection range E2 is defined as an azimuth range along the azimuth direction of the image detection point Pi from a first margin to a second margin inclusive; the first margin is obtained by subtraction of a predetermined angle $\Delta\theta$ from the azimuth angle $\theta$i at the image detection point Pi, which is referred to as ($\theta$i−$\Delta\theta$), and the second margin is obtained by the sum of the azimuth angle $\theta$i at the image detection point Pi and the predetermined angle $\Delta\theta$, which is referred to as ($\theta$i+$\Delta\theta$).

For example, the ECU 10 calculates an inclination angle at each of plural sampling points in the second inclination detection range E2, and calculates the average value of the calculated inclination angles as the inclination angle $\alpha$2 of the objective road section on which the preceding vehicle 60 is travelling. The ECU 10 can change the length of the second inclination detection range E2 along the azimuth direction depending on the relative distance r2 of the image detection point Pi.

As a further example, the ECU 10 can calculate an inclination angle at each of plural sampling points in the rectangular region defined by the first and second inclination detection ranges E1 and E2, and calculates the average value of the calculated inclination angles as the inclination angle $\alpha$2 of the objective road section on which the preceding vehicle 60 is travelling.

The inclination angle $\alpha$1 represents a positive value upon the reference road section on which the own vehicle 50 is travelling being an upslope, and a negative value upon the reference road section being a downslope. Similarly, the inclination angle $\alpha$2 represents a positive value upon the objective road section on which the preceding vehicle 60 is travelling being an upslope, and a negative value upon the objective road section being a downslope. In addition, the greater the gradient of the upslope or downslope reference road section is, the greater the absolute value of the inclination angle $\alpha$1 is. Similarly, the greater the gradient of the upslope or downslope reference road section is, the greater the absolute value of the inclination angle $\alpha$2 is.

When obtaining the inclination angle $\alpha$1 of the reference road section on which the own vehicle 50 is travelling and the inclination angle $\alpha$2 of the objective road section on which the preceding vehicle 60 is travelling, the ECU 10 calculates the relative gradient difference $\Delta\alpha$ between the reference road section on which the own vehicle 50 is travelling and the objective road section on which the preceding vehicle 60 is travelling. For example, the ECU 10 subtracts the inclination angle $\alpha$1 from the inclination angle $\alpha$2 to thereby calculate the relative gradient difference $\Delta\alpha$. The relative gradient difference $\Delta\alpha$ represents a positive value upon the objective road section on which the preceding vehicle 60 is travelling being an upslope (see FIG. 4), and a negative value upon the objective road section on which the preceding vehicle 60 is travelling being a downslope.

After completion of calculation of the relative gradient difference $\Delta\alpha$, the ECU 10 corrects, based on the calculated relative gradient difference $\Delta\alpha$, the location of the image search region Ri in the distance direction to thereby calculate a corrected image search region.

Figure 6A:
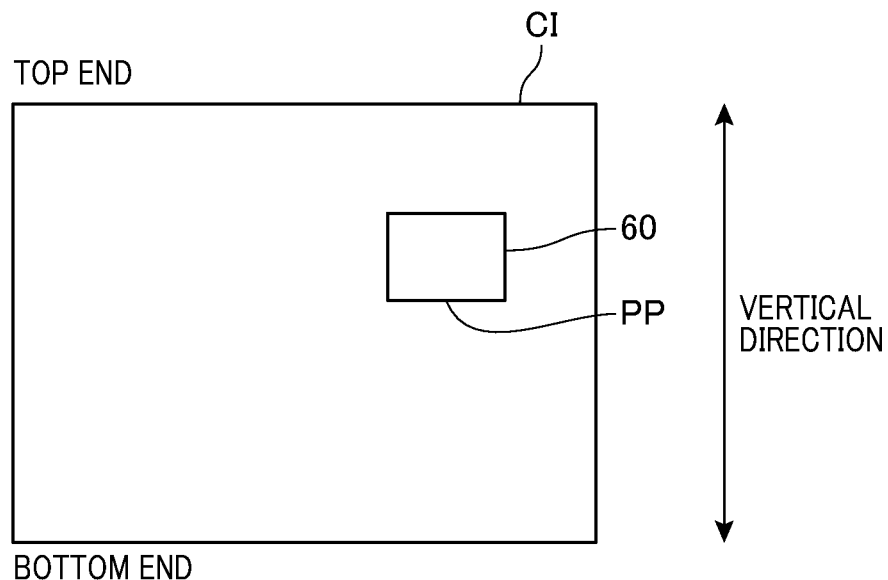
FIG. 6A is a diagram schematically illustrating a position of the center of a lower end of a preceding vehicle in a captured image in its vertical direction.
Figure 6B:
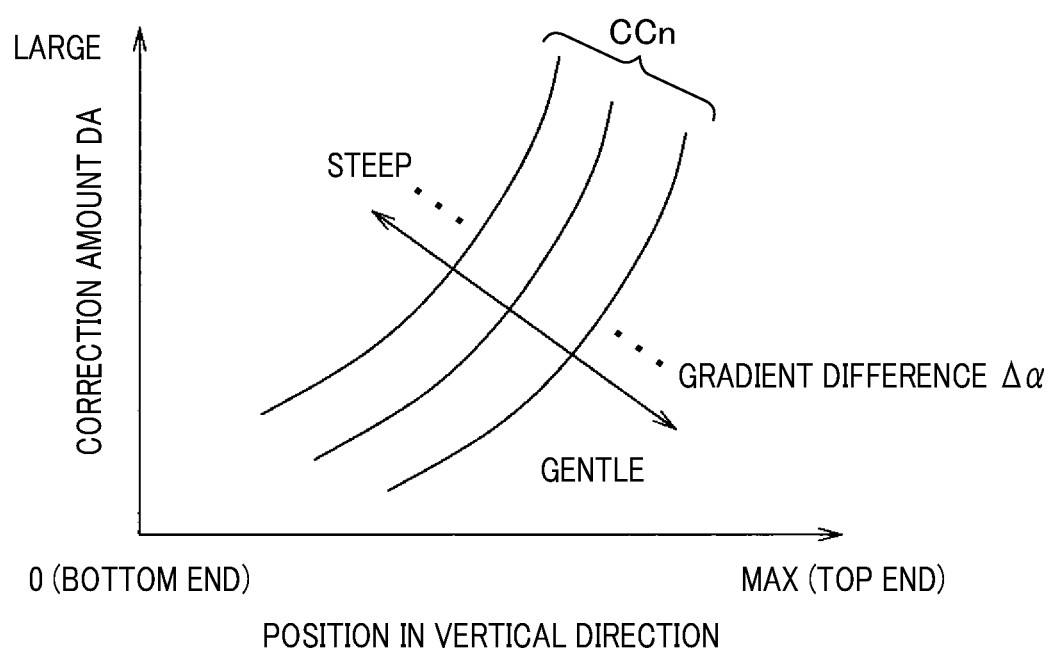
FIG. 6B is a graph schematically illustrating a relationship between a correction amount, the gradient difference, and the position of the center of the lower end of the preceding vehicle in the captured image in its vertical direction upon the gradient difference being positive.
Figure 7:
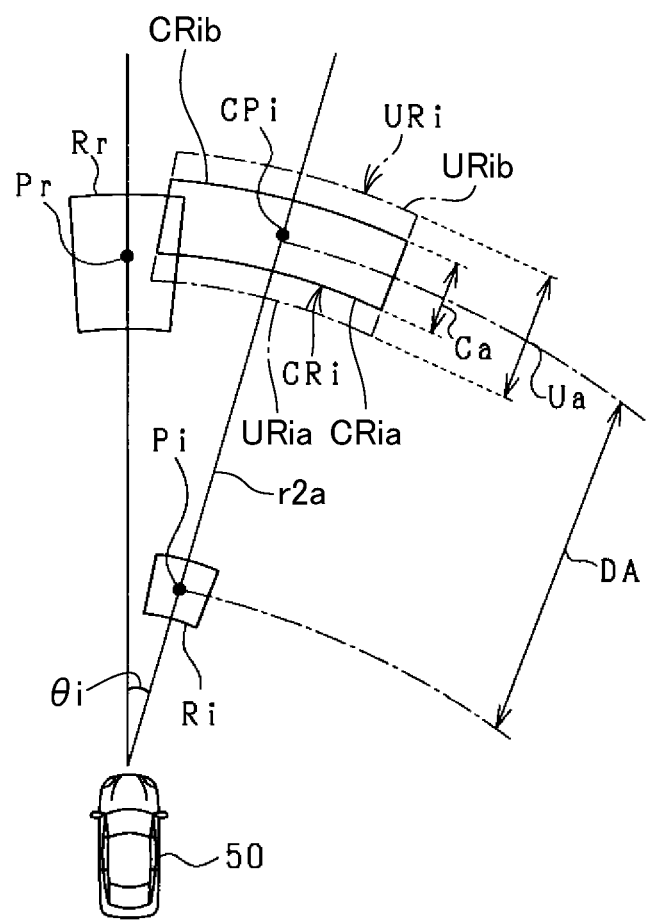
FIG. 7 is a diagram schematically illustrating how to correct the image search region upon the gradient difference being negative according to the present embodiment.

The following describes how the ECU 10 corrects the image search region Ri with reference to FIGS. 5 to 7.

First, the following describes how the ECU 10 corrects the image search region Ri if the objective road section on which the preceding vehicle 60 is travelling is an upslope relative to the reference road section on which the own vehicle 50 is travelling, so that the relative gradient difference $\Delta\alpha$ between the reference and objective road sections has a positive value with reference to FIGS. 5 and 6 (see FIG. 5). That is, FIG. 5 illustrates the radar search region Rr and the image search region Ri obtained by the ECU 10 under the situation illustrated in FIG. 4.

Under the situation illustrated in FIG. 5, the ECU 10 corrects the image search region Ri based on the relative gradient difference $\Delta\alpha$.

First, the ECU 10 corrects the image detection point Pi to be closer to the own vehicle 50 to thereby obtain a corrected image detection point CPi.

Specifically, the ECU 10 sets a correction amount DA for the image detection point Pi, and moves the image detection point Pi to be closer to the own vehicle 50 by the correction amount DA in the distance direction.

The ECU 10 for example sets the correction amount DA for the image detection point Pi in accordance with the relative gradient difference $\Delta\alpha$ and the position of the center of the lower end of the preceding vehicle 60 in the captured image in the vertical direction.

FIG. 6A schematically illustrates a captured image CI in which the preceding vehicle 60 is included. The position of the center of the lower end of the preceding vehicle 60 is illustrated as PP.

We consider that, the greater the relative gradient difference $\Delta\alpha$ is, the greater the deviation of the image detection point Pi from the location of an actual image detection point is. In addition, we consider that, the higher the position PP of the center of the lower end of the preceding vehicle 60 in the captured image CI in the vertical direction is, the greater the deviation of the image detection point Pi from the location of the actual image detection point is.

In accordance with the above considerations, the ECU 10 includes relationship information I1 stored in, for example, the ROM 12b of the memory 12. The relationship information I1 includes (1) The first relationship between values of the relative gradient difference Δα and values of the correction amount DA (2) The second relationship between values of the position PP of the center of the lower end of the preceding vehicle 60 in the captured image CI in the vertical direction and values of the correction amount DA For example, FIG. 6A illustrates that the bottom end of the captured image CI in the vertical direction represents the value of zero in the vertical direction, and the top end of the captured image CI represents a maximum value MAX in the vertical direction. A value of the position PP of the center of the lower end of the preceding vehicle 60 in the vertical direction of the captured image CI is determined based on the maximum value MAX and the ratio of the length of the point PP from the bottom end of the captured image CI to the length of the upper end of the captured image CI.

FIG. 6B schematically illustrates the first and second relationships as a graph. The graph has a horizontal axis and a vertical axis. The horizontal axis represents the values of the position PP of the center of the lower end of the preceding vehicle 60 in the captured image in the vertical direction. The vertical axis represents the values of the correction amount DA.

Specifically, the graph shows plural characteristics curves CCn each representing a relationship between the values of the correction amount DA and the values of the position PP of the center of the lower end of the preceding vehicle 60 in the captured image CI in the vertical direction while the relative gradient difference Δα is set to a corresponding value. That is, the characteristics curves CCn are prepared for the respective values of the relative gradient difference Δα.

Specifically, the ECU 10 obtains, from a captured image CI, the value of the position PP of the center of the lower end of the preceding vehicle 60, and calculates a value of the relative gradient difference Δα set forth above. Then, the ECU 10 extracts, from the relationship information I1, a value of the correction amount DA matching with the obtained value of the position PP of the center of the lower end of the preceding vehicle 60 and the calculated value of the relative gradient difference Δα.

For example, FIG. 6B illustrates that, the greater the relative gradient difference Δα is, the greater the value of the correction amount DA is, and the higher the position PP of the center of the lower end of the preceding vehicle 60 is, the greater the value of the correction amount DA is.

Following the obtaining of the corrected image detection point CPi set forth above, the ECU 10 sets, based on the corrected image detection point CPi, a corrected image searching region CRi in the relative coordinate system XY next.

Specifically, the ECU 10 sets, in the relative coordinate system XY, the corrected searching region CRi around the corrected image detection point CPi such that the corrected searching region Cri has a longitudinal width Ca and opposing lateral widths CRia and CRib.

Let us assume that a normal searching region set around the corrected image detection point CPi is defined as a region URi having a longitudinal width Ua and opposing lateral widths URia and URib. The longitudinal width Ua is an assumed error amount set with reference to the corrected image detection point CPi in the distance direction, and each of the opposing lateral widths URia and URib is also an assumed error amount set with reference to the corrected image detection point CPi in the azimuth direction.

As compared with the normal search region URi, the longitudinal width Ca of the corrected image detection point CPi in the distance direction is set to be smaller than the longitudinal width Ua of the normal search region URi. For example, the ECU 10 obtains the longitudinal width Ua, and multiplies the longitudinal width Ua by a predetermined percentage, such as 60%, thus obtaining the longitudinal width Ca of the corrected image detection point CPi. In contrast, as compared with the normal search region URi, each of the opposing lateral widths CRia and CRib of the corrected image detection point CPi in the azimuth direction is set to be identical to the corresponding one of the opposing lateral widths URia and URib of the normal search region URi.

That is, the ECU 10 corrects the location of the image search region Ri to be closer to the own vehicle 50, and corrects the longitudinal width of the moved image search region Ri to be narrower than the normal width Ua of the normal search region URi around the corrected image detection point CPi having a corrected relative distance r2a and the azimuth angle θi, which will be referred to as CPi(r2a, θi). In contrast, the ECU 10 maintains the radar search region Rr unchanged.

Next, the following describes how the ECU 10 corrects the image search region Ri if the objective road section on which the preceding vehicle 60 is travelling is a downslope relative to the reference road section on which the own vehicle 50 is travelling, so that the relative gradient difference Δα between the reference and objective road sections has a negative value with reference to FIG. 7. That is, FIG. 7 illustrates the radar search region Rr and the image search region Ri obtained by the ECU 10 under the situation where the relative gradient difference Δα between the reference and objective road sections has a negative value.

Reference characters of elements illustrated in FIG. 7, which are substantially identical to the corresponding elements illustrated in FIG. 5, are set to be identical to the corresponding reference characters illustrated in FIG. 5. Descriptions of the elements illustrated in FIG. 7, which are substantially identical to the corresponding elements illustrated in FIG. 5, are therefore omitted or simplified.

The ECU 10 for example sets the correction amount DA for the image detection point Pi in accordance with the relative gradient difference Δα and the position of the center of the lower end of the preceding vehicle 60 in the captured image CI in the vertical direction.

Figure 8:
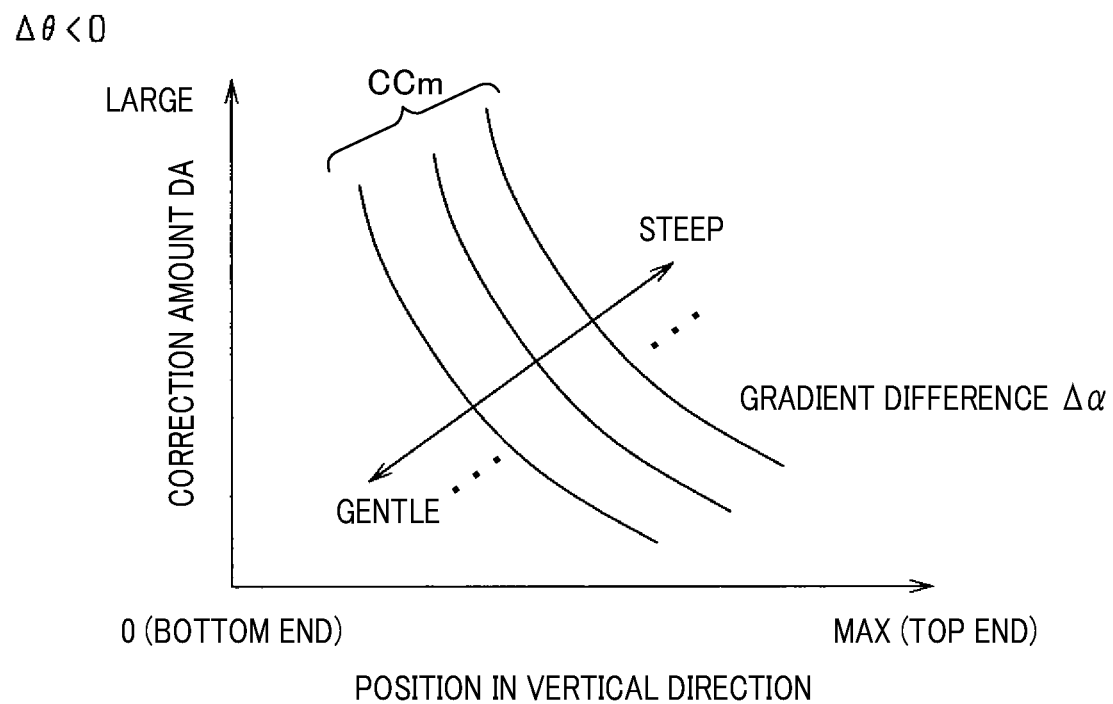
FIG. 8 is a graph schematically illustrating a relationship between a correction amount, the gradient difference, and the position of the center of the lower end of the preceding vehicle in the captured image in its vertical direction upon the gradient difference being negative.

That is, the ECU 10 includes relationship information I2 stored in, for example, the ROM 12b of the memory 12. The relationship information I2 includes (1) The first relationship between values of the relative gradient difference Δα and values of the correction amount DA (2) The second relationship between values of the position PP of the center of the lower end of the preceding vehicle 60 in the captured image CI in the vertical direction and values of the correction amount DA FIG. 8 schematically illustrates the first and second relationships as a graph. The graph has a horizontal axis and a vertical axis. The horizontal axis represents the values of the position PP of the center of the lower end of the preceding vehicle 60 in the captured image in the vertical direction. The vertical axis represents the values of the correction amount DA.

Specifically, the graph shows plural characteristics curves CCm each representing a relationship between the values of the correction amount DA and the values of the position PP of the center of the lower end of the preceding vehicle 60 in the captured image CI in the vertical direction while the relative gradient difference Δα is set to a corresponding value. That is, the characteristics curves CCm are prepared for the respective values of the relative gradient difference Δα.

Specifically, the ECU 10 obtains, from a captured image CI, the value of the position PP of the center of the lower end of the preceding vehicle 60, and calculates a value of the relative gradient difference Δα set forth above. Then, the ECU 10 extracts, from the relationship information I2, a value of the correction amount DA matching with the obtained value of the position PP of the center of the lower end of the preceding vehicle 60 and the calculated value of the relative gradient difference Δα.

For example, FIG. 7 illustrates that, the greater an absolute value of the relative gradient difference Δα is, the greater the value of the correction amount DA is, and the lower the position PP of the center of the lower end of the preceding vehicle 60 is, the greater the value of the correction amount DA is.

Following the obtaining of the corrected image detection point CPi set forth above, the ECU 10 sets, based on the corrected image detection point CPi, a corrected image searching region CRi in the relative coordinate system XY next.

Specifically, the ECU 10 sets, in the relative coordinate system XY, the corrected searching region CRi around the corrected image detection point CPi such that the corrected searching region CRi has a longitudinal width Ca1 and opposing lateral widths CRia and CRib.

Let us assume that a normal searching region set around the corrected image detection point CPi is defined as a region URi having a longitudinal width Ua and opposing lateral widths URia and URib. The longitudinal width Ua is an assumed error amount set with reference to the corrected image detection point CPi in the distance direction, and each of the opposing lateral widths URia1 and URib1 is also an assumed error amount set with reference to the corrected image detection point CPi in the azimuth direction.

As compared with the normal search region URi, the longitudinal width Ca of the corrected image detection point CPi in the distance direction is set to be smaller than the longitudinal width Ua1 of the normal search region URi1. In contrast, as compared with the normal search region URi1, each of the opposing lateral widths CRia and CRib of the corrected image detection point CPi in the azimuth direction is set to be identical to the corresponding one of the opposing lateral widths URia and URib of the normal search region URi.

That is, the ECU 10 corrects the location of the image search region Ri to be closer to the own vehicle 50, and corrects the longitudinal width of the moved image search region Ri to be narrower than the normal width Ua of the normal search region URi around the corrected image detection point CPi.

Next, the ECU 10 determines whether the radar search region Rr and the corrected image search region CRi are at least partly overlapped with each other.

Upon determining that the radar search region Rr and the corrected image search region CRi are at least partly overlapped with each other, the ECU 10 determines that the radar-detected object corresponding to the radar search region Rr is identical to the image-detected object corresponding to the image search region Ri.

Otherwise upon determining that the radar search region Rr and the corrected image search region CRi are not overlapped with each other, the ECU 10 determines that the radar-detected object corresponding to the radar search region Rr is a different object from the image-detected object corresponding to the image search region Ri.

Figure 9:
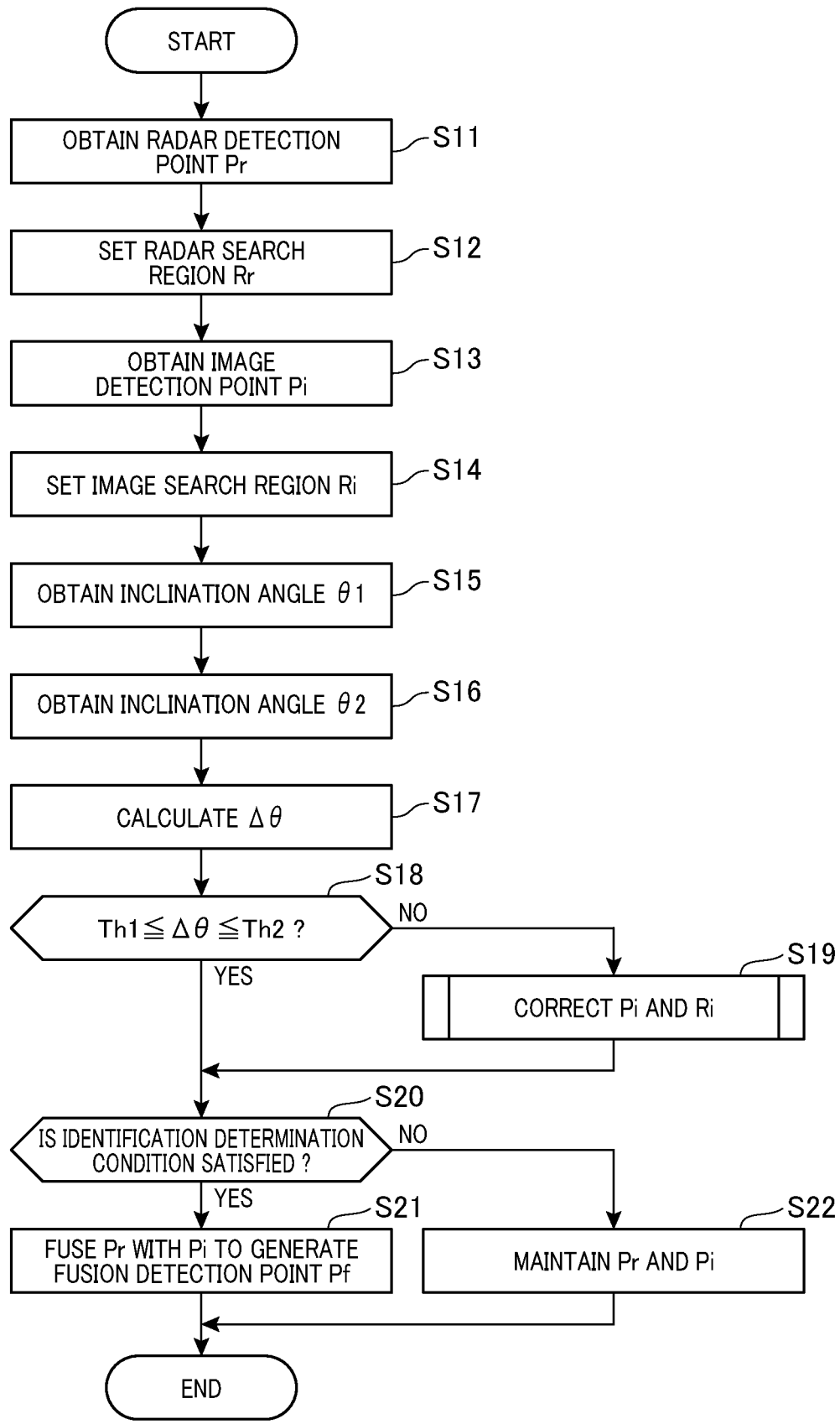
FIG. 9 is a flowchart schematically illustrating a fusion determination routine carried out by an ECU illustrated in FIG. 1.

Next, the following describes a fusion determination routine carried out by the ECU 10 with reference to FIG. 9. The ECU 10 is programmed to carry out the fusion object determination routine every predetermined period. Hereinafter, one fusion determination routine periodically performed by the ECU 10 will be referred to as a cycle.

When starting the fusion determination routine, the ECU 10 obtains the radar detection point Pr as the radar-detected position of a radar-detected object measured by the radar device 21 in step S11, and sets, in the relative coordinate system XY, the radar search region Rr in accordance with the radar detection point Pr in step S12.

That is, the ECU 10 serves as, for example, a first setter 10a to set the radar search region Rr in the relative coordinate system XY in steps S11 and S12.

Next, the ECU 10 obtains the image detection point Pi as the image-detected position of an image-detected object measured by the imaging device 22 in step S13, and sets, in the relative coordinate system XY, the image search region Ri in accordance with the image detection point Pi in step S14.

That is, the ECU 10 serves as, for example, a second setter 10b to set the image search region Ri in the relative coordinate system XY in steps S13 and S14.

Following the operation in step S14, the ECU 10 obtains the gradient information about the reference road section on which the own vehicle 50 in step S15. For example, the ECU 10 obtains, from the navigation system 23, the current location of the own vehicle 50 and information about the reference road section determined by the current location of the own vehicle 50 in step S15. Then, the ECU 10 obtains, from the information about the road at the current location of the own vehicle 50, the inclination angle α1 of the reference road section on which the own vehicle 50 is travelling in step S15.

Next, the ECU 10 obtains the gradient information about the objective road section on which the image-detected object, such as the preceding vehicle 60, is travelling or located in step S16. For example, the ECU 10 obtains, from the navigation system 23, information about the objective road section determined based on the estimated current location of the preceding vehicle 60 in step S16. Then, the ECU 10 obtains, from the information about the road at the estimated current location of the preceding vehicle 60, the inclination angle α2 of the objective road section on which the preceding vehicle 60 is travelling in step S16.

Then, the ECU 10 calculates the relative gradient difference Δα between the reference road section on which the own vehicle 50 is travelling and the objective road section on which the preceding vehicle 60 is travelling or located in step S17. For example, the ECU 10 subtracts the inclination angle α1 from the inclination angle α2 to thereby calculate the relative gradient difference Δα in step S17. The relative gradient difference Δα represents a positive value upon the objective road section on which the preceding vehicle 60 is travelling being an upslope, and a negative value upon the objective road section on which the preceding vehicle 60 is travelling being a downslope.

That is, the ECU 10 serves as, for example, an inclination calculator or a gradient calculator 10c to calculate the relative gradient difference Δα in steps S15 to S17.

Following the operation in step S17, the ECU 10 determines whether the calculated gradient difference Δα is equal to or more than a first threshold Th1 and equal to or less than a second threshold Th2 in step S18. For example, the first threshold Th1 is set to be zero or a negative value close to zero, and the second threshold Th2 is set to be zero or a positive value close to zero.

Upon determining that the calculated gradient difference Δα is equal to or more than the first threshold Th1 and equal to or less than the second threshold Th2 (YES in step S18), the fusion determination routine proceeds to step S20. That is, if the calculated gradient difference Δα is zero or a value very close to zero, which is within the range from the first threshold Th1 to the second threshold Th2 inclusive, the ECU 10 determines that there is no inclination difference between the reference road section on which the own vehicle 50 is travelling and the objective road section on which the preceding vehicle 60 is travelling. This therefore enables the ECU 10 to determine that there is no deviation of the location of the image search region Ri from the actual location of the image search region Ri in the distance direction.

Otherwise, upon determining that the calculated gradient difference Δα is less than the first threshold Th1 or more than the second threshold Th2 (NO in step S18), the fusion determination routine proceeds to step S19.

In step S19, the ECU 10 serves as, for example, a corrector 10d to correct the image detection point Pi and the image search region Ri based on the gradient difference Δα.

Figure 10B:
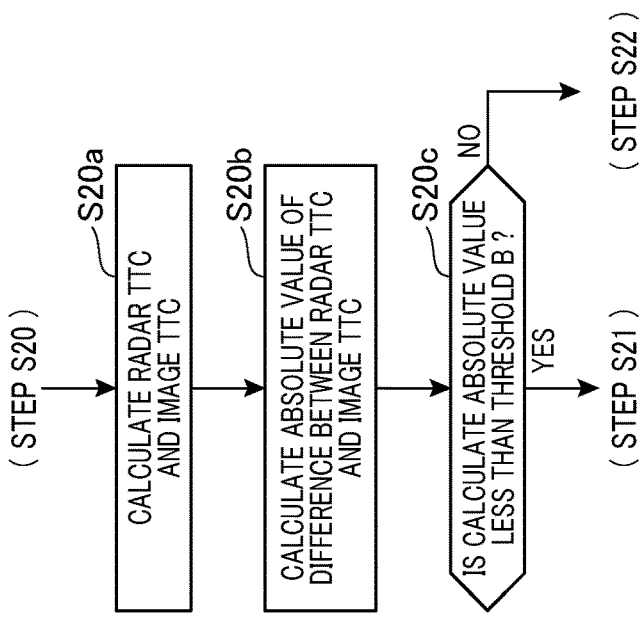
FIG. 10B is a flowchart schematically illustrating a modification of the operation in step S20 of the fusion determination routine illustrated in FIG. 9.
Figure 10A:
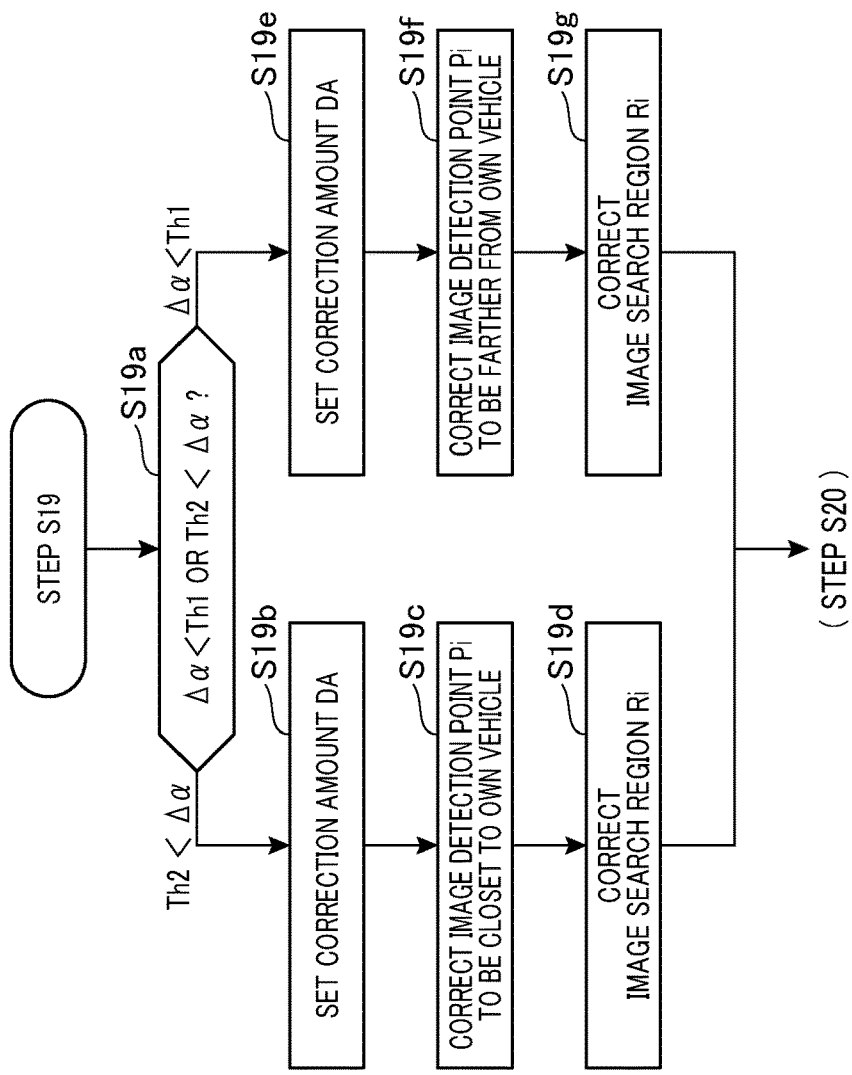
FIG. 10A is a flowchart schematically illustrating a subroutine of the operation in step S19 of the fusion determination routine illustrated in FIG. 9.

Specifically, the ECU 10 determines whether the gradient difference Δα is less than the first threshold Th1 or more than the second threshold Th2 in step S19a of FIG. 10A.

Upon determining that the gradient difference Δα is more than the second threshold Th2 in step S19a, the ECU 10 sets, in step S19b, a value of the correction amount DA in accordance with (1) A value of the gradient difference Δα
(2) A value of the position PP of the center of the lower end of the preceding vehicle 60 in the captured image CI
(3) The relationship information I1

Then, the ECU 10 corrects the image detection point Pi to be closer to the own vehicle 50 by the value of the correction amount DA to thereby obtain the corrected image detection point CPi in step S19c.

Following the operation in step S19c, the ECU 10 sets the corrected search region CRi around the corrected image detection point CPi such that the longitudinal width of the corrected image search region CRi is narrower than the normal image search region URi around the corrected image detection point CPi in step S19d.

Otherwise, upon determining that the gradient difference Δα is less than the first threshold Th1 in step S19a, the ECU 10 sets, in step S19e, a value of the correction amount DA in accordance with (1) A value of the gradient difference Δα
(2) A value of the position PP of the center of the lower end of the preceding vehicle 60 in the captured image CI
(3) The relationship information I2

Then, the ECU 10 corrects the image detection point Pi to be farther from the own vehicle 50 by the value of the correction amount DA to thereby obtain the corrected image detection point CPi in step S19f.

Following the operation in step S19f, the ECU 10 sets the corrected search region CRi around the corrected image detection point CPi such that the longitudinal width of the corrected image search region CRi is narrower than the normal image search region URi around the corrected image detection point CPi in step S19g.

After the affirmative determination in step S18 or after the operation in step S19, the ECU 10 serves as, for example, a determiner 10e to determine whether the radar-detected object corresponding to the radar search region Pr is identical with the image-detected object corresponding to the image search region Pi in accordance with the predetermined identification determination condition based on the radar search region Rr and either the image search region Ri or the corrected image search region CRi in step S20.

Specifically, in step S20, the ECU 10 uses, as the identification determination condition, determination of whether the radar search region Rr is at least partially overlapped with the image search region Ri to thereby determine whether the radar-detected object is identical with the image-detected object upon the determination in step S18 being affirmative.

In contrast, upon the image search region Ri having been corrected to the corrected image search region CRi, the ECU 10 uses, as the identification determination condition, determination of whether the radar search region Rr is at least partially overlapped with the corrected image search region CRi to thereby determine whether the radar-detected object is identical with the image-detected object in step S20.

Upon it being determined that the radar search region Rr is at least partially overlapped with the corrected image search region CRi, i.e. the identification determination condition is satisfied (YES in step S20), the ECU 10 determines that the radar-detected object is identical with the image-detected object, the fusion determination routine proceeding to step S21. Otherwise, upon it being determined that the radar search region Rr is not overlapped with the corrected image search region CRi, i.e. the identification determination condition is unsatisfied (NO in step S20), the ECU 10 determines that the radar-detected object is not identical with the image-detected object, the fusion determination routine proceeding to step S22.

Note that, in step S20, the ECU 10 can determine whether the radar-detected object corresponding to the radar search region Pr is identical with the image-detected object corresponding to the image search region Pi in accordance with a second determination condition based on the radar detection point Pr and the image detection point Pi.

For example, in step S20a of FIG. 10B, the ECU 10 calculates a radar TTC, which represents a margin time until which the own vehicle 50 would collide with the radar detection point Pr, and calculates an image TTC, which represents a margin time until which the own vehicle 50 would collide with either the image detection point Pi or the corrected image detection point CPi.

Then, in step S20b, the ECU 10 calculates an absolute value of the difference between the radar TC and the image TTC, and determines whether the calculated absolute value of the difference between the radar TTC and the image TTC is less than a predetermined threshold B in step S20c.

Upon determining that the calculated absolute value of the difference between the radar ITC and the image ITC is less than the predetermined threshold B, i.e. the second identification determination condition is satisfied (YES in step S20c), the ECU 10 determines that the radar-detected object is identical with the image-detected object, the fusion determination routine proceeding to step S21. Otherwise, upon it being determined that the calculated absolute value of the difference between the radar TC and the image TTC is equal to or more than the predetermined threshold B, i.e. the second identification determination condition is unsatisfied (NO in step S20c), the ECU 10 determines that the radar-detected object is not identical with the image-detected object, the fusion determination routine proceeding to step S22.

In step S21, the ECU 10 fuses, i.e. combines, the radar detection point Pr(r1, θr) with the image detection point Pi(r2, θi) or the corrected image detection point CPi(r2a, θi), thus generating a new fusion detection point Pf(r1, θi) for the same target object, i.e. the fusion target object.

Otherwise, in step S22, the ECU 10 maintains the radar detection point Pr(r1, θr) and the image detection point Pi(r2, θi) or the corrected image detection point CPi(r2a, θi) without generating the fusion detection point Pf(r1, θi).

Thereafter, the ECU 10 executes a task for determining whether there is a possibility of the own vehicle 50 colliding with the fusion target object or each of the radar-detector object and the image-detected object.

As described above, the vehicle control apparatus, i.e. the ECU 10, according to the present embodiment obtains the following benefits.

Specifically, the vehicle control apparatus is configured to (1) Calculate the gradient difference Δα between the reference road section on which the own vehicle 50 is travelling and the objective road section on which the preceding vehicle 60 is travelling (2) Correct, based on the gradient difference Δα, the relative distance of the image detection point Pi relative to the reference point O of the own vehicle 50 and the position of the image search region Ri in the distance direction (3) Determine whether the radar-detected object is identical with the image-detected object based on the radar search region and the corrected image search region CRi This configuration enables the corrected image search region CRi on which the gradient difference Δα has been reflected to be obtained, making it possible to accurately determine whether the radar-detected object is identical with the image-detected object. That is, this configuration enables the fusion detection point Pf to be accurately obtained even if the relative gradient difference Δα is generated between the reference road section on which the own vehicle 50 is travelling and the objective road section on which the preceding vehicle 60 is travelling.

Specifically, the vehicle control apparatus is configured to correct the location of the image search region Ri to be closer to the own vehicle 50 if the objective road section on which the preceding vehicle 60 is travelling is an upslope relative to the reference road section on which the own vehicle 50 is travelling, i.e. if the gradient difference Δα is greater than the second threshold Th2. In addition, the vehicle control apparatus is configured to correct the location of the image search region Ri to be farther from the own vehicle 50 if the objective road section on which the preceding vehicle 60 is travelling is a downslope relative to the reference road section on which the own vehicle 50 is travelling, i.e. if the gradient difference Δα is smaller than the first threshold Th1.

This configuration therefore enables the location of the image search region Ri to be accurately corrected depending on how the gradient difference Δα, which is due to an error in relative distance of the image search region Ri, is generated.

If the gradient difference Δα is generated between the reference road section on which the own vehicle 50 is travelling and the objective road section on which the preceding vehicle 60 is travelling, the error of the relative distance of the image detection point Pi relative to the own vehicle 50 probably changes depending on the position of the preceding vehicle 60 in the captured image in the vertical direction.

From this viewpoint, the vehicle control apparatus is configured to obtain a value of the correction amount DA as a function of a value of the gradient difference Δα and a value of the position of the preceding vehicle 60 in the captured image in the vertical direction.

This configuration results in the gradient difference Δα and the error of the relative distance of the image detection point Pi relative to the own vehicle 50 based on the position of the preceding vehicle 60 in the captured image in the vertical direction being reflected in the correction of the image detection point Pi. This therefore makes it possible to more suitably correct the relative distance of the image detection point Pi relative to the own vehicle 50, thus more suitably correcting the image search region Ri.

Making the longitudinal length, i.e. the longitudinal range, of the image search region Ri wide in correction of the image search region Ri being closer to or father from the own vehicle 50 would result in the identification determination condition being excessive likely to be satisfied, resulting in reduction of the accuracy of determining whether the radar-detected object is identical with the image-detected object.

From this viewpoint, the vehicle control apparatus is configured to correct the location of the image search region Ri to be closer to or farther from the own vehicle 50, and correct the longitudinal range of the corrected image search region Ri in the distance direction to be narrower. This configuration prevents the radar search region Rr and the corrected image search region CRi from being excessively overlapped with each other, thus preventing the identification determination condition from being excessively satisfied. This therefore prevents the accuracy of determining whether the radar-detected object is identical with the image-detected object from being reduced.

The vehicle control apparatus is configured to obtain the gradient information about the reference road section on which the own vehicle 50 is travelling and the gradient information on which the preceding vehicle 60 is travelling in accordance with (1) The relative distance from the own vehicle 50 to the preceding vehicle 60

(2) The map information M including roads on which the own vehicle 50 can travel Specifically, the vehicle control apparatus is configured to (1) Refer to the map information M about the road at the current location of the own vehicle 50 to thereby obtain the gradient information about the reference road section on which the own vehicle 50 is travelling (2) Refer to the map information M about the road at the estimated current location of the preceding vehicle 60 to thereby obtain the gradient information on which the preceding vehicle 60 is travelling This configuration therefore enables the relative gradient difference Δα between the reference road section on which the own vehicle 50 is travelling and the objective road section on which the preceding vehicle 60 is travelling to be more accurately calculated.

Modifications

The present disclosure has been described with respect to the present embodiment, however the present disclosure is not limited to the present embodiment, and various types of modifications can be implemented.

The present embodiment is configured to determine whether the radar-detected object is identical with the image-detected object in accordance with the radar search region Rr and the image search region Ri (see step S20), but the present disclosure is not limited thereto.

Specifically, the present disclosure can be configured to determine whether the radar-detected object is identical with the image-detected object in accordance with the radar detection point Pr and the image detection point Pi (see, for example, steps S20a to S20d).

For example, in step S20, the ECU 10 can be configured to determine whether the corrected image detection point CPi (see step S19) is located within a predetermined distance range around the radar detection point Pr, and determine whether the radar-detected object is identical with the image-detected object in accordance with the determination result of whether the corrected image detection point CPi is located within the predetermined distance range around the radar detection point Pr.

The present embodiment is configured to estimate, based on the relative distance of the image detection point Pi relative to the reference point O of the own vehicle 50, the current location of the preceding vehicle 60 in calculation of the inclination angle α2 of the objective road section on which the preceding vehicle 60 is travelling, but the present disclosure is not limited to this configuration. Specifically, the present disclosure can be configured to estimate, based on the relative distance of the radar detection point Pr relative to the reference point O of the own vehicle 50, the current location of the preceding vehicle 60.

The present embodiment is configured to correct, based on the calculated relative gradient difference Δα, the location of the image detection point Pi, and correct, based on the corrected location of the image detection point Pi, the location of the image search region Ri in the distance direction, but the present disclosure is not limited thereto.

Specifically, the present disclosure can be configured to correct, based on the calculated relative gradient difference Δα, the location of the image search region Ri in the distance direction directly without correcting the location of the image detection point Pi.

That is, the ECU 10 according to this modification is configured to (1) Set a value of the correction amount DA in accordance with a value of the preceding vehicle 60 in the captured image in the vertical direction and a value of the relative gradient difference Δα

(2) Correct the image search region Ri in the distance direction based on the value of the correction amount DA to thereby obtain the corrected image search region CRi The present disclosure can be configured to variably set the percentage by which the longitudinal range of the image search region Ri is to be corrected. For example, the present disclosure can be configured to variable set the percentage depending on the correction amount DA. For example, the present disclosure can be configured to reduce the percentage with an increase of the correction amount DA, making it possible to prevent the identification determination condition from being satisfied excessively easily.

The present embodiment assumes that the fusion target object is a preceding vehicle 60, but the present disclosure can be configured to detect a bicycle or a pedestrian as a target object, such as a fusion target object.

The ECU 10 according to the present embodiment is applied to the PCS system 100, and is configured to improve the accuracy of determining whether a radar-detected object is identical with an image-detected object to thereby carry out an improved collision avoidance operation and/or an improved damage mitigation operation. The ECU 10 according to the present embodiment can be applied to an adaptive cruise control (ACC) system that controls the own vehicle 50 to follow a preceding vehicle 60. This enables the adaptive cruise control of the own vehicle 50 to be more accurately carried out.

The functions of one element in the present embodiment can be distributed as plural elements, and the functions that plural elements have can be combined into one element. At least part of the structure of the present embodiment can be replaced with a known structure having the same function as the at least part of the structure of the present embodiment. A part of the structure of the present embodiment can be eliminated.

All aspects included in the technological ideas specified by the language employed by the claims constitute embodiments of the present disclosure.

While the illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. An apparatus for controlling an own vehicle that is travelling on a reference road section, the own vehicle including a radar device and an imaging device that are each configured to perform a target-object detection operation, the apparatus comprising:

a first obtainer configured to obtain first location information about a radar-detected object in accordance with a result of the target-object detection operation performed by the radar device, the first location information including a first distance of the radar-detected object relative to the own vehicle and a first azimuth of the radar-detected object relative to the own vehicle;

a second obtainer configured to obtain second location information about an image-detected object located on an objective road section based on a result of the target-object detection operation performed by the imaging device, the second location information including a second distance of the image-detected object relative to the own vehicle and a second azimuth of the image-detected object relative to the own vehicle;

a gradient calculator configured to calculate a gradient difference between a reference gradient of the reference road section and a target gradient of the objective road section;

a corrector configured to correct, based on the calculated gradient difference, the second location information about the image-detected object to thereby correct the second distance of the image-detected object relative to the own vehicle; and a determiner configured to determine whether the radar-detected object is identical with the image-detected object in accordance with the first location information about the radar-detected object and the corrected second location information about the image-detected object.

2. The apparatus according to claim 1, wherein:
the imaging device is configured to capture an image of a region including the image-detected object as the target-object detection operation, the image having a predetermined height in a vertical direction thereof and a width in a horizontal direction thereof; and
the corrector is configured to:
  obtain a correction amount in accordance with the gradient difference and a position of a predetermined point of the image-detected object in the captured image in the vertical direction; and
  correct the second distance of the image-detected object relative to the own vehicle in accordance with the obtained correction amount.

3. The apparatus according to claim 1, wherein:
the first obtainer is configured to obtain, as the first location information, a first search region that:
  includes the first position of the radar-detected object; and
  has a predetermined distance range along a direction of the first distance relative to the own vehicle and a predetermined azimuth range along a direction of the first azimuth relative to the own vehicle;
the second obtainer is configured to obtain, as the second location information, a second search region that:
  includes the second position of the image-detected object; and
  has a predetermined distance range along a direction of the second distance relative to the own vehicle and a predetermined azimuth range along a direction of the second azimuth relative to the own vehicle;
the corrector is configured to correct, based on the calculated gradient difference, a location of the second search region in the direction of the second distance; and
the determiner is configured to determine whether the radar-detected object is identical with the image-detected object in accordance with the first search region and the corrected second search region.

4. The apparatus according to claim 3, wherein:
the corrector is configured to:
  correct the second search region to be closer to the own vehicle; and
  correct the distance range of the second search region to be narrower upon the target gradient of the objective road section being positively greater than the reference gradient of the reference road section; and
the determiner is configured to determine whether the first search region is at least partially overlapped with the corrected second search region to thereby determine whether the radar-detected object is identical with the image-detected object.

5. The apparatus according to claim 3, wherein:
the corrector is configured to:
  correct the second search region to be farther from the own vehicle; and
  correct the distance range of the second search region to be narrower upon the target gradient of the objective road section being smaller than the reference gradient of the reference road section; and
the determiner is configured to determine whether the first search region is at least partially overlapped with the corrected second search region to thereby determine whether the radar-detected object is identical with the image-detected object.

6. The apparatus according to claim 3, wherein:
the imaging device is configured to capture an image of a region including the image-detected object as the target-object detection operation, the image having a predetermined height in a vertical direction thereof and a width in a horizontal direction thereof; and
the corrector is configured to:
  obtain a correction amount in accordance with the gradient difference and a position of a predetermined point of the image-detected object in the captured image in the vertical direction; and
  correct the location of the second search region in the direction of the second distance.

7. The apparatus according to claim 1, wherein:
the gradient calculator is configured to calculate the gradient difference between the reference gradient of the reference road section and the target gradient of the objective road section in accordance with:
  the second distance of the image-detected object relative to the own vehicle; and
  map information including roads on which the own vehicle is enabled to travel.

8. The apparatus according to claim 2, further comprising:
a storage storing relationship information that includes:
  a relationship between:
    values of the gradient difference;
    values of the position of the predetermined point of the image-detected object in the captured image in the vertical direction; and
    values of the correction amount,
wherein the corrector is configured to:
  extract, from the relationship information, a value of the correction amount, the extracted value of the correction amount matching with a present value of the gradient difference and a present value of the position of the predetermined point of the image-detected object in the captured image in the vertical direction; and
  correct the second distance of the image-detected object relative to the own vehicle in accordance with the extracted value of the correction amount.

9. A method of controlling, using a computer, an own vehicle that is travelling on a reference road section, the own vehicle including a radar device and an imaging device that are each configured to perform a target-object detection operation, the method being configured to cause the computer to execute the steps of:
  obtaining first location information about a radar-detected object in accordance with a result of the target-object detection operation performed by the radar device, the first location information including a first distance of the radar-detected object relative to the own vehicle and a first azimuth of the radar-detected object relative to the own vehicle;
  obtaining second location information about an image-detected object located on an objective road section based on a result of the target-object detection operation performed by the imaging device, the second location information including a second distance of the image-detected object relative to the own vehicle and a second azimuth of the image-detected object relative to the own vehicle;

calculating a gradient difference between a reference gradient of the reference road section and a target gradient of the objective road section;
correcting, based on the calculated gradient difference, the second location information about the image-detected object to thereby correct the second distance of the image-detected object relative to the own vehicle; and
determining whether the radar-detected object is identical with the image-detected object in accordance with the first location information about the radar-detected object and the corrected second location information about the image-detected object.

* * * * *